Figure 7:
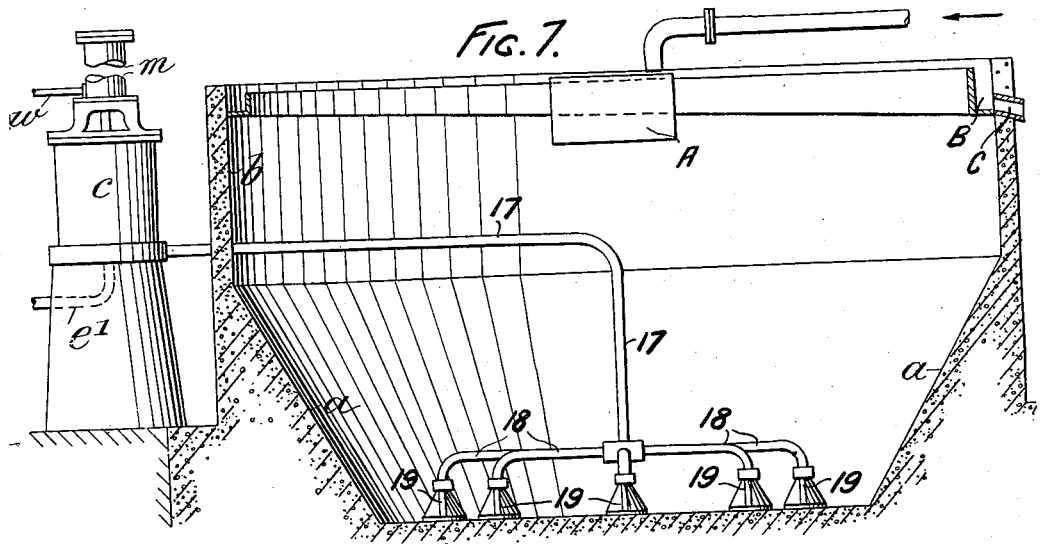

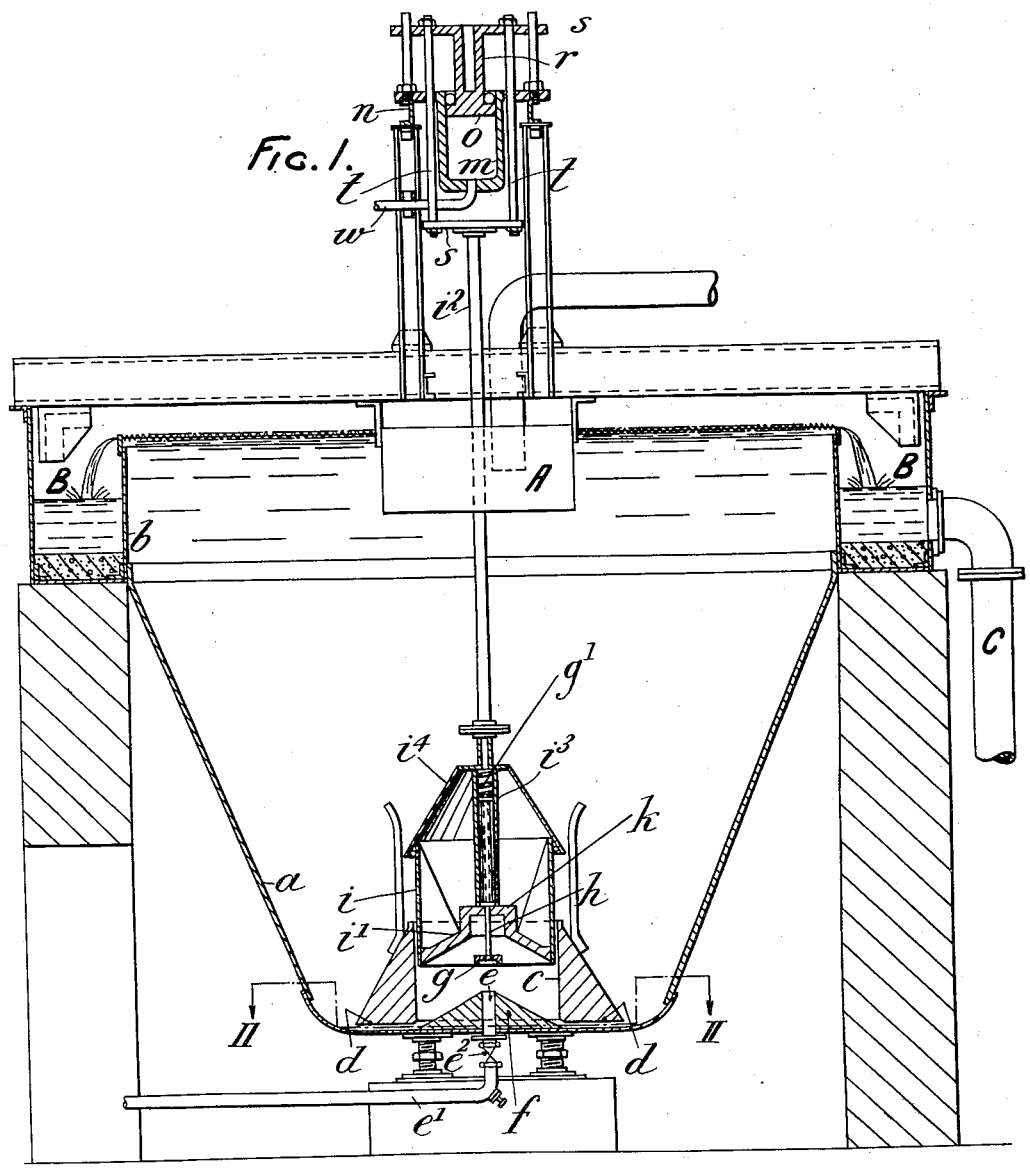
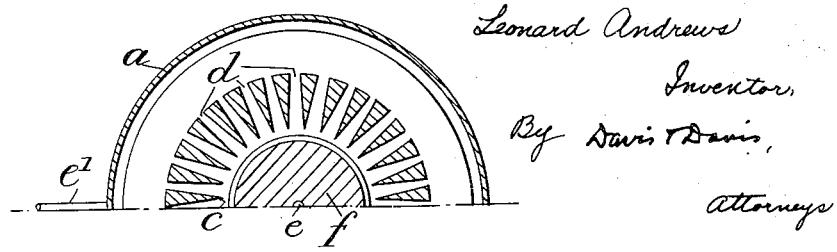

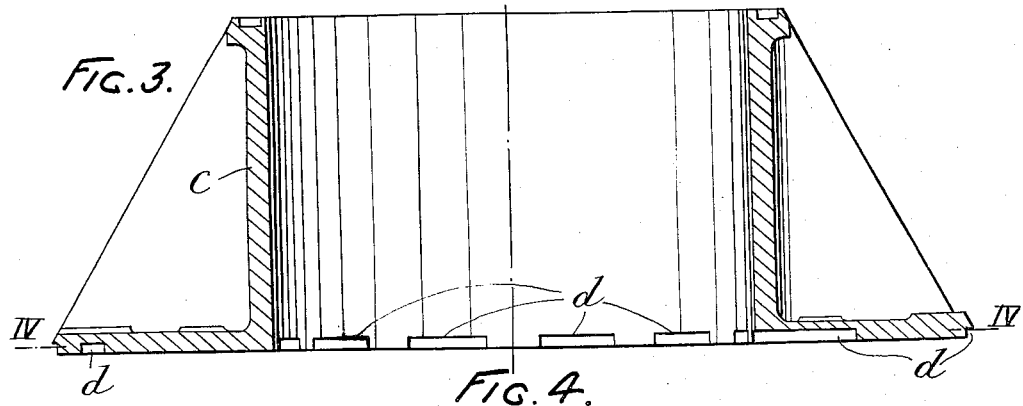
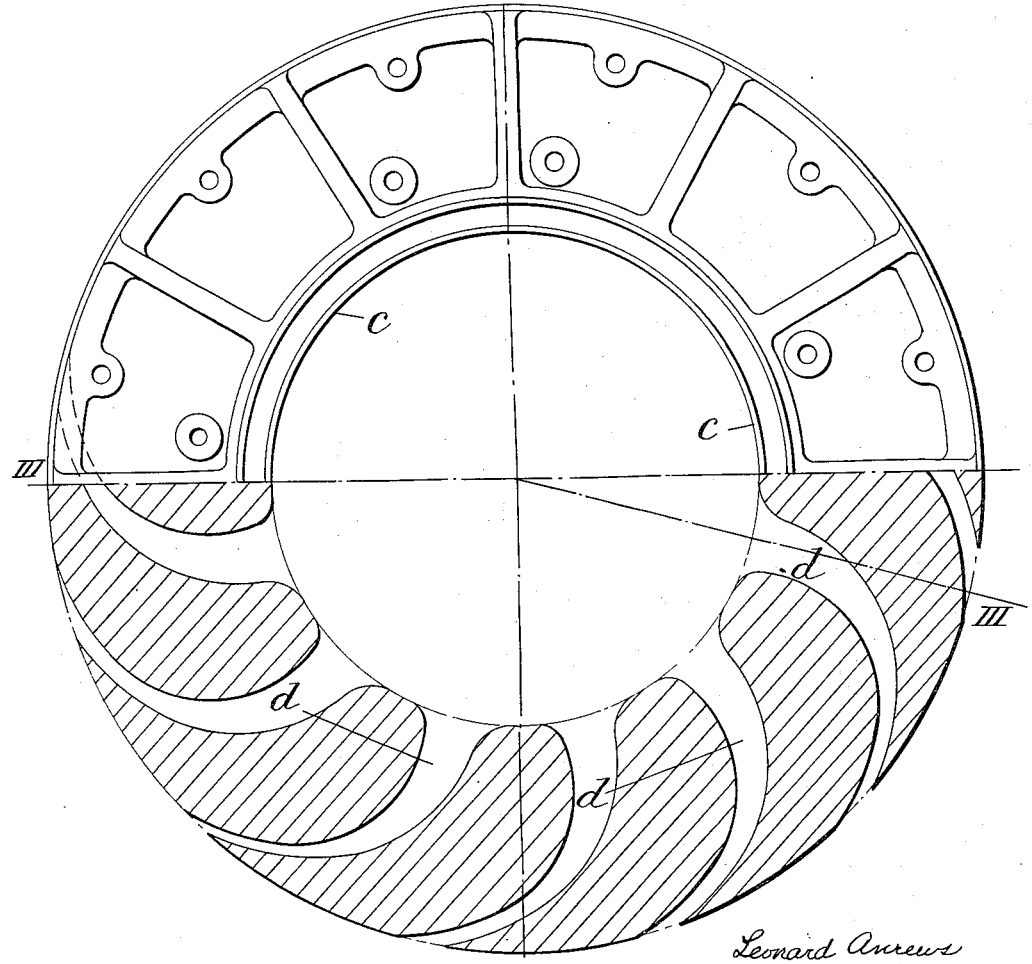

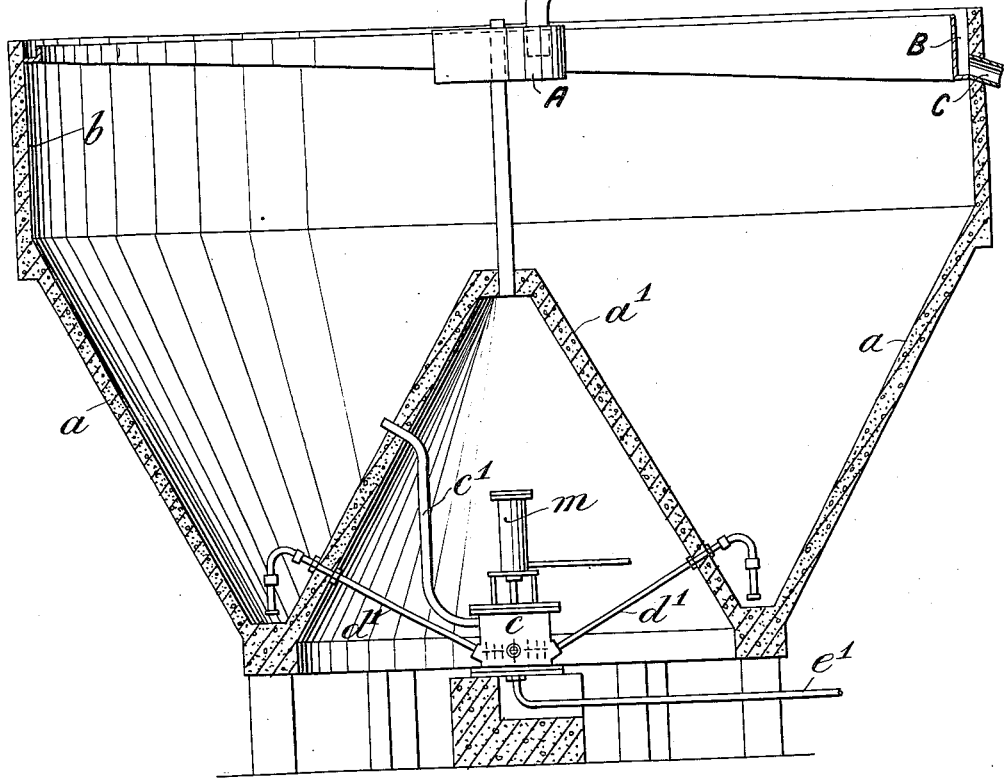
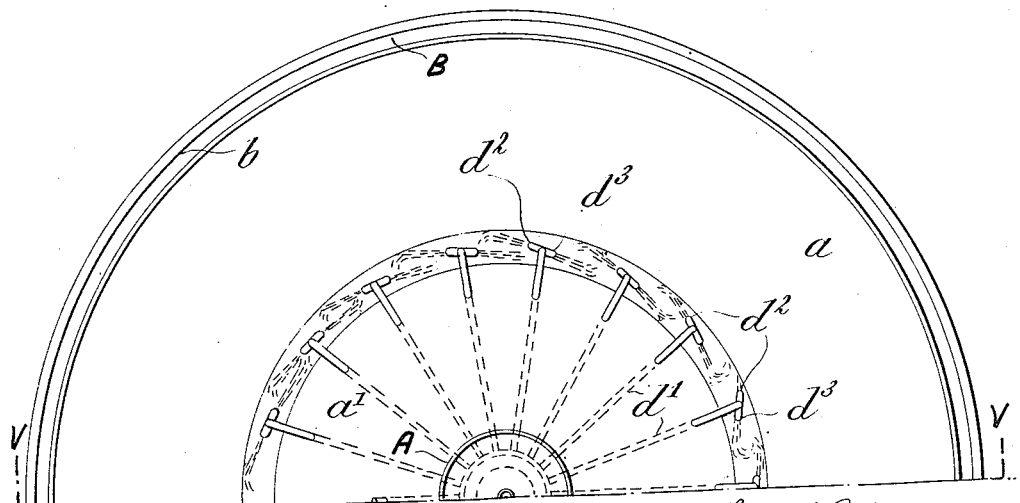

March 26, 1935.  L. ANDREWS  1,995,559
SETTLING TANK
Filed Nov. 29, 1932   5 Sheets-Sheet 4

Leonard Andrews,
Inventor

March 26, 1935.  L. ANDREWS  1,995,559

SETTLING TANK

Filed Nov. 29, 1932  5 Sheets-Sheet 5

Leonard Andrews,
Inventor,
By Davis & Davis,
Attorneys.

Patented Mar. 26, 1935

1,995,559

UNITED STATES PATENT OFFICE 1,995,559

SETTLING TANK

Leonard Andrews, Pinner, England

Application November 29, 1932, Serial No. 644,856
In Great Britain January 21, 1932

14 Claims. (Cl. 210—58)

This invention relates to settling tanks of the kind used in plants of various kinds, into which liquid containing a relatively small amount of finely divided solid matter is to be delivered in a continuous manner and from which the solid matter is allowed to separate slowly therefrom by gravity and be deposited in the lower portion of the tank, the supernatant clarified liquid being run off continuously from the top of the tank and the deposited solid matter, with more or less admixed liquid, being discharged from time to time through a valve controlled discharge pipe at the bottom of the tank.

As an example of industrial plants in which such a settling tank is used, reference may be had to the large plants burning solid fuel, as for instance steam power plants and blast furnace plants, in which it is necessary to wash the escaping products of combustion with water to remove therefrom sulphur and other poisonous gases, and finely divided solid matter, for instance ash, in order to prevent pollution thereby of the external atmosphere. Also, as a large quantity of water has to be used for the purpose mentioned and such water, after use, is frequently treated chemically for the removal therefrom of the sulphur and other poisonous substances therein, it is desirable to remove the finely divided solid material from the washing water so that the resulting liquid thus purified, can be re-used. For the removal of the finely divided solid material, the washing water is run into one or more settling tanks in which the solid matter is allowed to settle by gravity, the washing water being admitted continually to the tank at one part of the upper portion thereof and clarified water being allowed to run away continually, also from the upper portion of the tank, but at a part thereof remote from the place of entry. Water softening plants constitute another example in which water containing a relatively small proportion of finely divided matter is delivered into a settling tank for the removal from the water of the finely divided solid matter suspended therein. In each case, owing to the very finely divided and light condition of the solid matter and the relatively large quantity of water in which it is suspended, the solid matter descends slowly in the water, and in order to allow sufficient time for the solid matter to have descended to a sufficient depth at the outlet side of the tank to admit of clarified water being drawn off therefrom, the tank has to be made of large superficial area. It is necessary to provide means for the collection of the solid matter settling from the large volume of water referred to, and for the periodic removal of such matter from the tank, or each tank, in a condition reasonably free from water, for instance in the condition of a dense slurry or sludge. For this purpose, the falling particles of solid matter must be brought to rest successively, or their downward movement be so retarded by the rising streams of water displaced by the gradually increasing mass of deposited solid matter, that further settlement is exceedingly slow. During such period of slow settlement, the individual particles brought to rest, form, or tend to form, aggregations of particles which, on discharge of the tank, resist the flow of less dense sludge, causing the latter to select lines of least resistance, thereby forming channels through or around the aggregated material. These aggregations gradually accumulate or build up in the tank, thereby limiting the depth through which the particles of solid matter can fall, until finally effective separation of solid matter from the water ceases. When this occurs, the tank has to be put out of use and the deposited banks of aggregated solid matter dug out or otherwise removed, causing loss of time and necessitating the expenditure of considerable labour, thus interferring with the continuous use of the settling tank and increasing the cost of operation of the tank.

The present invention has for its object to avoid these serious practical disadvantages by causing the finely divided aggregated solid matter slowly deposited in the lower portion of a settling tank from a large quantity of water, as above set forth, before being discharged from the tank, to be uniformly disassociated or loosened in such a manner that it can afterwards be freely discharged as sludge in an effective and uniform manner from all parts of the lower portion of the tank so as to prevent any gradual building up therein of portions of such solid matter.

For this purpose, a number of distributed jets or streams of liquid are, after each discharge of deposited matter from the bottom of the settling tank, discharged into the lower portion of the tank and the aggregated solid matter remaining therein, so as to disassociate or loosen such matter and afterwards enable it to be discharged freely as sludge from the bottom of the tank. For enabling the aggregated solid matter to be thus disassociated or loosened from time to time, as required, before being discharged from the tank, there is associated with the lower portion of a settling tank of the kind referred to, means adapted to admit of a number of jets or streams of liquid being forced into the lower portion of the tank for the purpose set forth. Such means (hereinafter referred to as sludge controlling means) may conveniently comprise a stationary vertically arranged cylinder the lower end of which communicates circumferentially through a number of passages or nozzles with the lower internal portion of the associated settling tank and is arranged over a centrally disposed sludge outlet passage the upper end of which is controlled by a vertically movable discharge valve and the lower end of which communicates with an external discharge pipe. The cylinder (hereinafter called for distinction the sludge cylinder) is fitted with a vertically movable piston or plunger with which are associated means whereby it can be lifted and lowered at desired intervals, and means are provided whereby the discharge valve can also be lifted and lowered at desired times. The arrangement is such that while finely divided solid matter is being slowly collected in the lower portion of the tank, the discharge valve is in its lower and closed position while the piston or plunger (hereinafter called the plunger) is in its lower position. When it is desired to discharge collected finely divided solid matter from the lower portion of the tank, the plunger is lifted, thereby causing solid matter and water, in the form of sludge, to be sucked into the cylinder from all around the lower portion of the tank, after which the discharge valve is raised to open it and allow sludge to flow from all round the tank and through the sludge cylinder and discharge passage for any suitable time, after which the discharge valve and plunger are lowered, the valve first closing the discharge passage, and the plunger then falling and discharging the sludge that is within the cylinder, from the lower end thereof, radially thereto in all directions into the lower portion of the tank in such a manner as to disassociate and scour aggregated particles of solid matter left therein. The discharge valve may be arranged to be raised and lowered at the required times, by upward and downward movement of the plunger. By means such as described, finely divided light matter can be separated from and removed in an effective manner from large quantities of water in which it was suspended, so as to enable an effluent to be obtained suitable for re-use as washing water when this is desired.

In the accompanying illustrative drawings, Fig. 1 shows in vertical section and Fig. 2 in horizontal half section on the line II—II of Fig. 1, a settling tank provided with one arrangement of sludge controlling means according to the invention, Fig. 3 shows in vertical section on the line III—III of Fig. 4, and Fig. 4 partly in horizontal section on the line IV—IV of Fig. 3 and partly in plan, a modified construction of part of the sludge controlling means. Fig. 5 is a vertical section on the line V—V of Fig. 6 and Fig. 6 is a half plan, of a modified construction of settling tank and sludge controlling means. Fig. 7 shows partly in vertical section and partly in side elevation and Fig. 8 in plan, a further modified construction of settling tank and sludge controlling means. Fig. 9 shows partly in elevation and partly in vertical section, mechanism for timing the operations of the sludge controlling means.

In the arrangement shown in Figs. 1 and 2, the solid matter disassociating means is arranged within the lower truncated conical shaped upper portion $a$ of a settling tank the upper $b$ of which is of cylindrical shape. The liquid to be dealt with is admitted through a centrally arranged distributing device A at the top of the tank and the clarified liquid is caused to flow across the top of the tank into an outer annular trough B and discharge pipe C. In this arrangement the disassociating means comprises a sludge cylinder $c$ having a wide base in the underside of which are formed a large number of radial grooves $d$ each of tapering shape with its narrower end at the outer circumference of the base and its inner and wider end at the inner circumference of the base, the arrangement being such that the grooves form, with the bottom of the tank, to which the sludge cylinder is secured, a number of radial passages between the lower end of the cylinder and the surrounding lower annular portion of the tank. The sludge discharge passage $e$ is formed in a conical base piece $f$, fixed to the bottom of the tank, centrally below the cylinder, and communicating with a discharge pipe $e^1$, which may be provided with a hand operated shut off valve $e^2$. $g$ is the discharge valve controlling the discharge passage $e$ and carried by a vertical rod $h$. The plunger $i$ fitting the cylinder $c$ may be hollow, as shown or partly hollow, and have a conical shaped bottom $i^1$ corresponding to that of the said conical base piece $f$, and a heavy head. The plunger is connected to a vertical rod $i^2$ the lower end portion $i^3$ of which is hollow and carries a truncated conical shaped sleeve $i^4$. The valve rod $h$ extends freely through the plunger $i$ and into the hollow portion $i^3$ of the rod $i^2$ and is provided with a collar $k$ at a part thereof above the said conical bottom $i^1$ which is so shaped at its centre, as to accommodate the valve $g$ when both are in their lower positions. Between the top of the valve rod $h$ and the upper end of the hollow portion $i^3$ of the rod $i^2$ is a coiled spring $g^1$ adapted to press the valve on its seat when the plunger is reaching its lowest position. The arrangement is such that the plunger $i$ can make the greater part of its upward or suction stroke, to draw sludge into the cylinder $c$ from the lower portion $a$ of the tank through the passages or nozzles $d$, without lifting the valve $g$, which it does just before completing such stroke, to allow of deposited matter being then discharged from the tank through the passages $d$, discharge passage $e$ and discharge pipe $e^1$, the cut off valve $e^2$ in which is then open. On afterwards commencing its downstroke, it will allow the valve rod $h$ and valve $g$ to descend and close the discharge passage $e$ and then move downward independently of the rod and valve to make its delivery or scouring stroke and force the sludge within the cylinder through the passages $d$ into the lower portion of the tank for the purpose set forth.

In some cases, where the aggregated finely divided solid matter in the lower portion of the tank has assumed an exceptionally pronounced cohesive condition, it may be necessary to repeat the dissassociating operation two or three times before discharging disassociated matter as sludge from the bottom of the tank. In this case the shut off valve $e^2$ in the discharge pipe $e^1$ is closed during such repeated disassociating treatment.

The means used for raising and lowering the plunger $i$ with discharge valve $g$, can be variously constructed but is preferably such that the upward and downward movements of the plunger can each take place quickly. For this purpose, there may conveniently be employed a pneumatic motor. In one example of this kind, shown in Fig. 1, the pneumatic motor comprises a vertical cylinder $m$, fixed to an overhead structure $n$, supported above the settling tank $a$ $b$ and fitted with a piston or plunger $o$ the rod $r$ of which is suitably connected, it may be through crossheads $s$ and rods $t$, to the rod $i^2$ connected to the upper end of the plunger $i$. The motor cylinder $m$ is provided with a motive fluid inlet and outlet pipe $w$ connected to fluid controlling means whereby motive fluid can be admitted to and exhausted from the motor cylinder at the desired times. The fluid controlling means may advantageously be operated in an automatic manner at desired times by automatically operated timing means adapted to admit of the motor plunger being raised at predetermined times and of its being afterwards allowed to fall under the action of gravity. Fluid controlling means and timing means therefor, adapted to act in this manner can be variously constructed. According to one construction, shown in Fig. 9, the fluid controlling means comprises two air cylinders 1 and 2 each connected to the pipe $w$ in communication with the inlet and outlet port of the motor cylinder $m$ (Fig. 1). The cylinder 1 is fitted with a centrally arranged air inlet pipe 3 connected at one end by a pipe 4 to a source of air under pressure, its other and inner end being arranged near to and opposite a flexible diaphragm 5 connected to the adjacent end of the cylinder and adapted to act as a valve. The air cylinder 2 is fitted with a centrally arranged pipe 6 open at one end to exhaust, its other and inner end being arranged near to and opposite a flexible diaphragm 7 connected to the adjacent end of the said cylinder 2 and adapted to act as a valve. Associated with and arranged between the two cylinders 1 and 2, which are coaxially arranged, are two levers 8 and 9 each adapted, under the control of timing means, to force inward and release, alternately, its diaphragm valve 5 or 7. The arrangement is such that when the diaphragm valve 5 associated with cylinder 1 is forced inward by its lever 8, it will close the inner end of the compressed air supply pipe 3 and prevent compressed air being admitted to the motor cylinder $m$, and the diaphragm valve 7 associated with the cylinder 2 will afterwards be released at the required time, by its lever 9 so as to open the exhaust pipe 6 in that cylinder and place the motor cylinder $m$ in communication with that pipe, the plunger in that cylinder and the plunger $i$ and discharge valve $g$ of the sludge cylinder $c$ being then allowed to fall into their lower positions. When the diaphragm valve 5 of cylinder 1 is released by its lever 8, it will be moved into its open position by the pressure of the compressed air thereon and allow compressed air to flow to the motor cylinder and raise the plunger $o$ therein and the plunger $i$ in the sludge cylinder $c$, at which time the diaphragm valve 7 of cylinder 2 will be pressed inward by its lever 9 so as to close the exhaust pipe 6 and the connection between it and the motor cylinder $m$. The two levers 8 and 9 may be operated at the desired times for the purpose mentioned, by timing means comprising two rotary disc cams 10 and 11 that are geared together by toothed wheels 12 and 13 and driven, it may be through reduction gear at 14, by an electric or other motor, for instance an electric motor 15, adapted to be put in and out of action at the required times, as by an automatically acting clock controlled timing switch device 16. Each cam disc 10 and 11 is provided with a recess $10^a$ or $11^a$ adapted to receive a projection on the arm of the lever 8 or 9, made preferably as a spring arm, opposite to the arm that acts upon the corresponding diaphragm valve 5 or 7. By suitably shaping and arranging the cams, the said diaphragm valves can be actuated and released at the desired times and in the required order for controlling the pneumatic motor $m$, $o$ for the purpose set forth.

Instead of the passages or nozzles $d$ being arranged radially, as in the arrangement shown in Figs. 1 and 2, they may, as in the modified construction in Figs. 3 and 4, with advantage, be made of curved shape, so that the jets or streams of sludge material forced through them into the lower portion $a$ of the tank, on the descent of the piston $i$ in the sludge cylinder $c$, will, by contact with the tank, have a whirling motion imparted to them.

In the modified construction shown in Figs. 5 and 6, the settling tank $a$ $b$ is, with a view to reducing its depth, provided with a central truncated conical extension $a^1$ carried by the bottom of the tank and forming with the lower truncated conical portion $a$ of the tank, an annular depositing region for deposited solid matter. In this case, the sludge cylinder $c$ with its associated sludge discharge valve and air motor $m$, $o$, is arranged within the conical extension $a^1$, and has its lower end connected to a number of radially arranged pipes $d^1$ which extend through the conical extension $a^1$ and terminate within the lower portion of the tank. The end of each pipe $d^1$ within the tank is provided with a nozzle, or, as shown, preferably with two oppositely arranged nozzles $d^2$, $d^3$, arranged tangentially to the inner surface of the lower portion $a$ of the tank so that the streams of sludge, on issuing from the several nozzles, will, by interaction between themselves and the wall of tank and the conical extention $a^1$, have a whirling motion imparted to them. $c^1$ is a vent pipe connecting the top of the sludge cylinder $c$ with the interior of the tank $a$, $b$.

Figure 8:
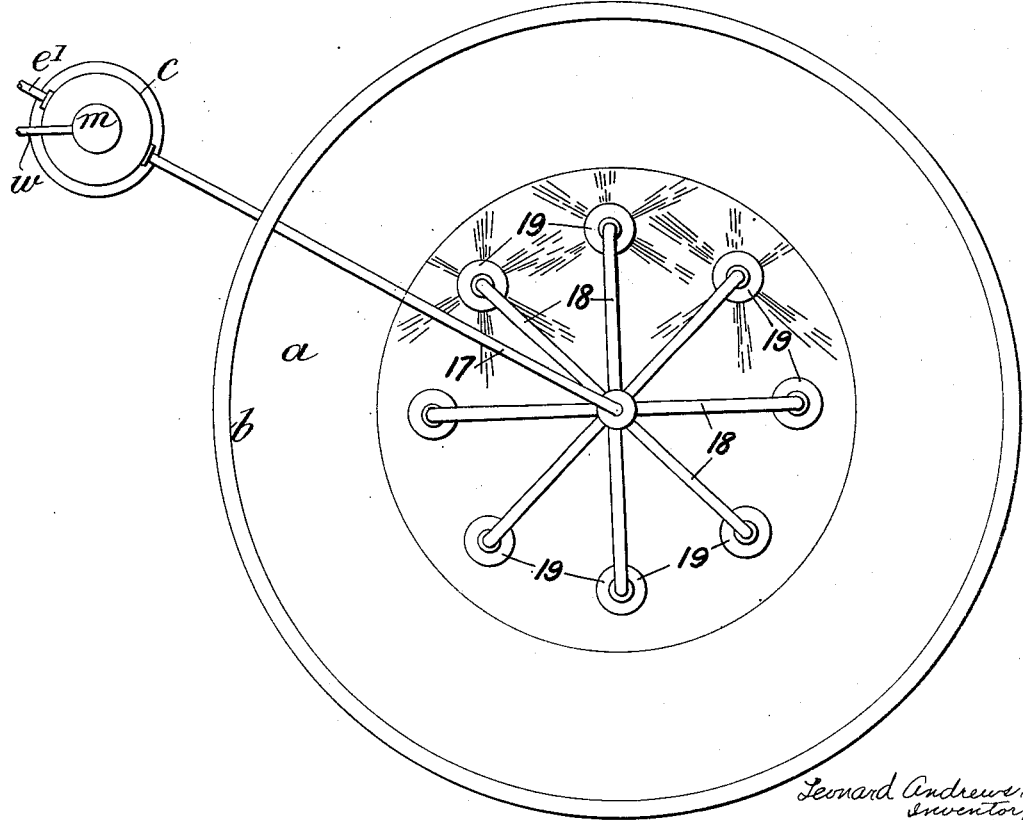
Figure 9:
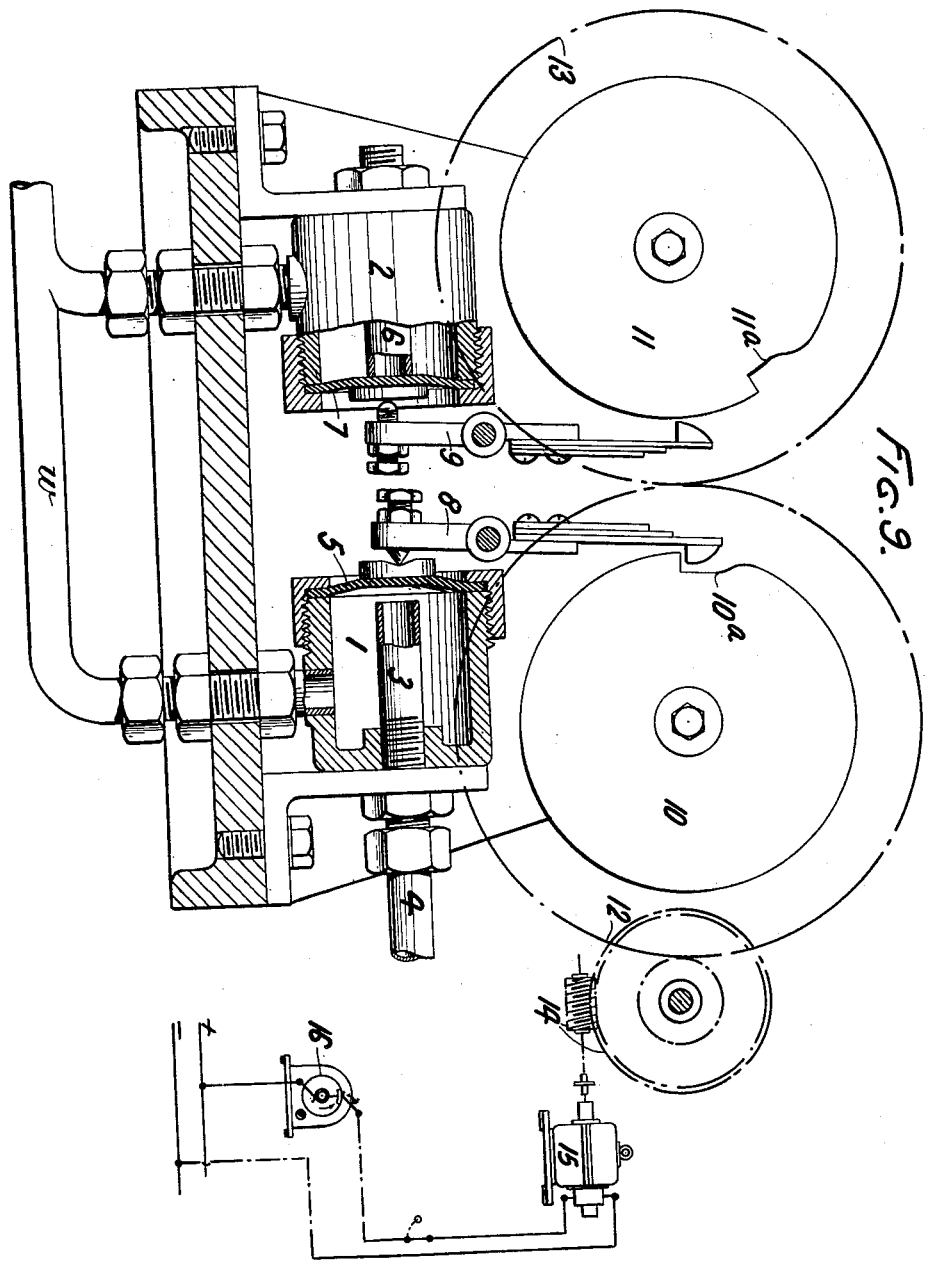

In the further modified arrangement shown in Figs. 7 and 8, the sludge cylinder $c$ with its associated sludge discharge valve and sludge discharge passage and pipe, and air motor $m$, $o$, is arranged outside of and clear of the settling tank $a$, $b$. In this example the sludge cylinder $c$ is connected at its lower end to a pipe 17 that extends into the lower portion $a$ of the settling tank where it is connected to a number of radially arranged distributing pipes 18 each provided at its downward bent free end with a nozzle device 19. Each of these nozzle devices consists of a metal cone resting on the bottom of the tank and having therein a central vertical passage communicating with its distributing pipe 18 and with a number of radial or curved passages formed in its lower side so as to admit of streams of sludge delivered through the pipes 17 and 18 from the sludge cylinder $c$, being discharged laterally into the lower portion of the tank when the plunger in the sludge cylinder $c$ makes its downstroke.

In each of the modified arrangements described, the sludge controlling means operates in the same manner as that hereinbefore described with reference to Figs. 1 and 2.

What I claim is:—

1. In the separation of finely divided solid matter from liquid within a settling tank having a normally closed opening at the bottom, the method of enabling aggregated finely divided solid matter deposited in the lower portion of the said tank to be discharged therefrom in an effective and uniform manner from all parts thereof, which consists in periodically withdrawing a portion of deposited matter with liquid from the lower portion of the tank and afterwards forcing the mixture back, in the form of streams, into the bottom of the tank and the aggregated matter therein and thereby cause the latter to become uniformly and effectively disassociated, allowing the disassociated matter to rest for a period and afterwards opening the said outlet and allowing the said disassociated matter to be discharged therethrough in the form of sludge.

2. In the separation of finely divided solid matter from liquid within a settling tank having a normally closed opening at the bottom, the method of enabling aggregated finely divided solid matter deposited in the lower portion of the said tank to be discharged therefrom in an effective and uniform manner from all parts thereof, which consists in forcing periodically and in an automatic manner and while said outlet is closed, a plurality of tangentially directed streams of liquid into and around the lower portion of the tank and aggregated deposited matter therein so as to cause the aggregated matter to become uniformly and effectively disassociated, allowing the disassociated matter to rest for a period and afterwards opening the said outlet and allowing the said disassociated matter to be discharged therethrough in the form of sludge.

3. In a settling tank of the kind herein referred to having an outlet for the discharge periodically, from its lower end portion, of finely divided solid matter slowly deposited therein, a valve normally closing said outlet, means adapted automatically and periodically to withdraw a mixture of liquid and deposited matter from the lower portion of said tank and afterwards to force such mixture in the form of distributed streams back into the lower portion of said tank and aggregated matter therein so as to disassociate such matter, and means adapted automatically and subsequent to each disassociating operation, to open said valve and permit disassociated matter to be freely discharged as sludge through said outlet.

4. The combination with a settling tank of the kind herein referred to, of a cylinder, a number of suction and delivery passages connecting one end of said cylinder to the lower portion of said tank, a tank discharge outlet in communication with the said end of the cylinder, a normally closed valve controlling said outlet, a plunger within said cylinder, means for causing said plunger to move upwardly and withdraw a mixture of liquid and deposited solid matter from the lower portion of said tank through said passages into said cylinder and afterwards to move downwardly and discharge the mixture from said cylinder in the form of distributed streams, through said passages, back into the lower portion of said tank and aggregated solid matter therein so as to disassociate such matter, and means adapted automatically and while said plunger is moving into its upward position, to open said valve to permit disassociated solid matter to be discharged as sludge from the lower portion of said tank through said passages, cylinder and outlet.

5. The combination with a settling tank, of a cylinder, a number of suction and delivery passages connecting one end of said cylinder to the lower portion of said tank, an outlet, in communication with the said end of the cylinder, a valve controlling said outlet, a plunger within said cylinder, means adapted to cause said plunger to move endways against the action of a returning force, in a direction to cause a mixture of liquid and solid matter to be sucked from the lower portion of said tank, through said passages into said cylinder and afterwards to release said plunger and enable it to be moved in the opposite direction by said returning force and force the mixture from said cylinder through said passages into the lower portion of said tank and the aggregated deposited matter therein, and means whereby said valve can be opened to admit of the disassociated solid matter being freely discharged as sludge from the lower portion of said tank through said passages, cylinder and outlet.

6. The combination with a settling tank, of a vertically arranged cylinder, a number of suction and delivery passages extending from the lower end of said cylinder to the lower portion of said tank at distributed points therein, a sludge discharge outlet in communication with the lower end of said cylinder, a valve normally closing said outlet, a plunger movable in said cylinder, means adapted to lift said plunger and thereby cause a mixture of liquid and solid matter to be drawn from the lower portion of said tank, through said passages, into said cylinder and afterwards to release said plunger and allow it to fall and force said matter from the cylinder back through said passages into the lower portion of the tank and aggregated deposited matter therein and disassociate such matter, and means for opening said valve to enable disassociated matter to flow freely, as sludge, through said sludge outlet.

7. A settling tank and associated parts according to claim 6, wherein the cylinder and plunger are located within the lower portion of the tank and the suction and delivery passages are formed in the base of said cylinder.

8. A settling tank according to claim 6, wherein the cylinder and plunger are located within the lower portion of said tank and the suction and delivery passages are made of curved shape and formed in the base of said cylinder.

9. The combination with a settling tank, of a vertically arranged cylinder, a sludge discharge outlet communicating with the lower end of said cylinder, a valve normally closing said discharge outlet, a number of suction and delivery passages extending from the lower end of said cylinder to a number of distributed points in the lower end portion of said tank, a plunger movable in said cylinder, means for alternately raising and releasing said plunger, and means adapted to lift said valve and open said discharge outlet when the said plunger nearly reaches the upper end of its suction stroke, and to release said valve and allow it to fall and close said outlet when said plunger commences to fall and make its delivery stroke.

10. A settling tank and associated parts according to claim 6, wherein the bottom of the tank is provided with an upwardly projecting hollow conical extension and the cylinder with plunger, sludge discharge outlet and controlling valve therefor, are located within said hollow conical extension and has its lower end connected to the lower portion of said tank by a number of suction and delivery pipes that extend through the wall of said conical extension and are provided within said lower portion of the tank with discharge nozzles.

11. A settling tank and associated parts according to claim 6, wherein the cylinder with plunger, sludge discharge outlet and controlling valve therefor, is arranged external to the tank and has its lower end connected to the lower end portion of the tank by a main pipe extending through the wall of the tank, and a number of radially disposed distributing pipes each connected at one end to said main pipe and provided at its other end with a nozzle device arranged near the bottom of the said lower portion of the tank.

12. The combination with a settling tank, of a vertically arranged cylinder, a sludge discharge outlet arranged centrally below and adapted to communicate with said cylinder, a number of suction and delivery passages, connecting the lower end of said cylinder with the lower end portion of said tank, a plunger movable vertically in said cylinder, a lift valve controlling said sludge discharge outlet, a rod connected to said valve and extending through said plunger and adapted to be engaged by said plunger to lift and open said valve when the plunger nearly reaches the end of its upward suction stroke and to permit said rod and valve to fall and allow the valve to close said outlet when said plunger commences its downward compression stroke, spring means adapted to press said valve against its seat when the plunger completes its downstroke and means for lifting and releasing said plunger at predetermined times.

13. The combination with a settling tank, of a vertically arranged cylinder having a sludge discharge outlet at its lower end, a number of suction and delivery passages connecting the lower end of said cylinder with the lower end portion of said tank, a plunger vertically movable in said cylinder, a valve controlling said sludge discharge outlet and adapted to be opened by said plunger when the same nearly reaches the end of its upward or suction stroke and to close said outlet when the plunger commences its downward or delivery stroke, a motor adapted to raise and lower said plunger and means adapted to cause said motor to lift and lower said plunger at predetermined times.

14. A settling tank with associated parts according to claim 4, wherein the sludge discharge outlet is connected to a sludge discharge pipe provided with a hand operated cut off valve whereby said pipe can, when desired, be closed to prevent discharge of sludge therethrough.

LEONARD ANDREWS.